US012565264B2

(12) United States Patent
Kamimae et al.

(10) Patent No.: US 12,565,264 B2
(45) Date of Patent: Mar. 3, 2026

(54) STEER-BY-WIRE STEERING APPARATUS

(71) Applicants: TOYOTA JIDOSHA KABUSHIKI KAISHA, Toyota (JP); JTEKT CORPORATION, Kariya (JP)

(72) Inventors: Hajime Kamimae, Okazaki (JP); Yoshio Kudo, Machida (JP); Tomoyuki Iida, Nisshin (JP); Yuko Goto, Okazaki (JP); Takahito Ishino, Numazu (JP); Atsushi Ishihara, Sakurai (JP); Junya Miyake, Okazaki (JP)

(73) Assignees: TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 93 days.

(21) Appl. No.: 18/585,894

(22) Filed: Feb. 23, 2024

(65) Prior Publication Data

US 2024/0286673 A1     Aug. 29, 2024

(30) Foreign Application Priority Data

Feb. 27, 2023     (JP) ................................. 2023-028280

(51) Int. Cl.
   *B62D 6/00*       (2006.01)
   *B62D 5/00*       (2006.01)
   *B62D 5/04*       (2006.01)

(52) U.S. Cl.
   CPC ............. *B62D 6/002* (2013.01); *B62D 5/006* (2013.01); *B62D 5/046* (2013.01)

(58) Field of Classification Search
   CPC ........ B62D 6/002; B62D 5/006; B62D 5/046; B62D 6/008; B62D 5/001; B62D 5/0469; B62D 6/00
   See application file for complete search history.

(56) References Cited

U.S. PATENT DOCUMENTS

2020/0377152 A1*  12/2020  Taniguchi .............. B62D 5/046
2021/0009198 A1*   1/2021  Suzuki ................... B62D 5/006
2022/0097758 A1    3/2022  Kasai et al.

FOREIGN PATENT DOCUMENTS

EP        3 315 383 A1    5/2018
JP        2020-131783 A   8/2020
JP        2021-115937 A   8/2021
JP        2022-54838 A    4/2022

* cited by examiner

*Primary Examiner* — Joseph J Dallo
(74) *Attorney, Agent, or Firm* — Sughrue Mion, PLLC

(57)                ABSTRACT

A reaction force actuator applies, during normal operation, a steering reaction force, which rapidly increases upon approaching an upper limit of a virtual steering range, to a steering wheel. During rapid steering in which a turning angle velocity is greater than or equal to a predetermined value and a turning follow delay is greater than or equal to a predetermined value, the reaction force actuator applies a steering reaction force to the steering wheel based on an upper limit corresponding to a narrower virtual steering range.

4 Claims, 3 Drawing Sheets

STEER-BY-WIRE STEERING APPARATUS

CROSS REFERENCE TO RELATED APPLICATION

This application claims priority to Japanese Patent Application No. 2023-28280 filed on Feb. 27, 2023, which is incorporated herein by reference in its entirety including the specification, claims, drawings, and abstract.

TECHNICAL FIELD

The present disclosure relates to a steer-by-wire steering apparatus, and in particular to a steering reaction force applied to a steering wheel.

BACKGROUND

In conventional steering apparatuses, a steering wheel manipulated by a driver is mechanically linked to a vehicle wheel which is to be turned. This contrasts with steer-by-wire steering apparatuses, in which the steering wheel is not mechanically linked to the vehicle wheel to be turned. In a steer-by-wire steering apparatus, a steering angle which is an angle of steering manipulation of the steering wheel is converted into an electrical signal, and a turning actuator turns the vehicle wheel based on this electrical signal. Generally, the ratio of the turning angle with respect to the steering angle is larger in a steer-by-wire steering apparatus in comparison to the conventional steering apparatuses. That is, when the steering angle is the same, the turning angle of the turning wheel is larger in the steer-by-wire steering apparatus than in the conventional steering apparatus.

In addition, a reaction force actuator applies a steering reaction force opposing the steering of the driver is applied to the steering wheel. This makes it possible for the driver to understand road surface situations and limits of the steering range through the steering reaction force.

JP 2021-115937 A discloses a technique in which the steering reaction force is increased according to an increase of the steering angle in a region where a cornering force characteristic becomes nonlinear. The nonlinear region described above is defined based on a lateral acceleration of a vehicle and a torque for turning the turning wheel. When a slip angle of the turning wheel becomes large, the cornering force characteristic becomes nonlinear. The increase in the steering reaction force suppresses excessive manipulation of the steering wheel.

In the region where the cornering force characteristic becomes nonlinear, the increase in a cornering force is small in comparison to the increases in the steering angle and the turning angle. Therefore, steering and turning of the wheel in this region is not effective in relation to the increase in the cornering force.

On the other hand, when the driver suddenly rapidly steers the steering wheel, the steering angle to be manipulated by the driver does not significantly differ between the steer-by-wire steering apparatus and the conventional steering apparatus. In the meantime, as described above, in the steer-by-wire steering apparatus, because of the large ratio of the turning angle with respect to the steering angle, the turning angle becomes large. When the turning angle becomes large at a time of rapid steering, there may be cases in which the cornering force characteristic becomes nonlinear. As described above, the turning of the vehicle wheel in the nonlinear region is not effective, and excessive turning results. It is difficult to suppress the excessive turning if the steering reaction force is increased after the cornering characteristic became nonlinear.

An advantage of the present disclosure lies in suppression of excessive turning of the wheel in relation to rapid steering.

SUMMARY

According to one aspect of the present disclosure, there is provided a steer-by-wire steering apparatus comprising a steering angle sensor that detects a steering angle of a steering wheel; a turning actuator that turns a turning wheel according to a target turning angle which is a control target value of a turning angle of the turning wheel, calculated based on the steering angle; a turning angle sensor that detects an actual turning angle which is an actual turning angle of the turning wheel turned by the turning actuator; and a reaction force actuator that applies a steering reaction force, opposing a steering manipulation of a driver, to the steering wheel. The reaction force actuator applies, when the steering angle becomes close to an end of a virtual steering range which is a virtual steering range of the steering wheel, an end steering reaction force, which rapidly increases with the approaching to the end of the virtual steering wheel, to the steering wheel. Further, the reaction force actuator applies the end steering reaction force to the steering wheel based on the virtual steering range which is narrower than that during a normal time, during rapid steering in which a turning angle velocity calculated based on the actual turning angle is greater than or equal to a predetermined value, or a steering angle velocity calculated based on the steering angle is greater than or equal to a predetermined value.

By narrowing the virtual steering range during the rapid steering, excessive turning of the wheel can be suppressed.

During rapid steering, when a turning follow delay which is a difference between the target turning angle and the actual turning angle is greater than or equal to a predetermined value, the reaction force actuator may apply the end steering reaction force to the steering wheel based on the virtual steering range of the normal time in place of the narrower virtual steering range. It is thereby possible to suppress narrowing of the steering range when a counter-steer manipulation is to be performed.

The reaction actuator may apply the end steering reaction force to the steering wheel based on the virtual steering range which becomes narrower as the turning angle velocity becomes larger, and/or as the turning follow delay becomes larger.

According to another aspect of the present disclosure, there is provided a steer-by-wire steering apparatus comprising a steering angle sensor that detects a steering angle of a steering wheel; a turning actuator that turns a turning wheel according to a target turning angle which is a control target value of a turning angle of the turning wheel, calculated based on the steering angle; and a reaction force actuator that applies a steering reaction force, opposing a steering manipulation of a driver, to the steering wheel. The reaction force actuator applies, when the steering angle becomes close to an end of a virtual steering range which is a virtual steering range of the steering wheel, an end steering reaction force, which rapidly increases with the approaching to the end of the virtual steering range, to the steering wheel, and applies the end steering reaction force to the steering wheel based on the virtual steering range which is narrower than that during a normal time, during rapid steering in which a steering angle velocity calculated based on the steering angle is greater than or equal to a predetermined value.

BRIEF DESCRIPTION OF DRAWINGS

Embodiments of the present disclosure will be described based on the following figures, wherein.

DESCRIPTION OF EMBODIMENTS

Figure 1:
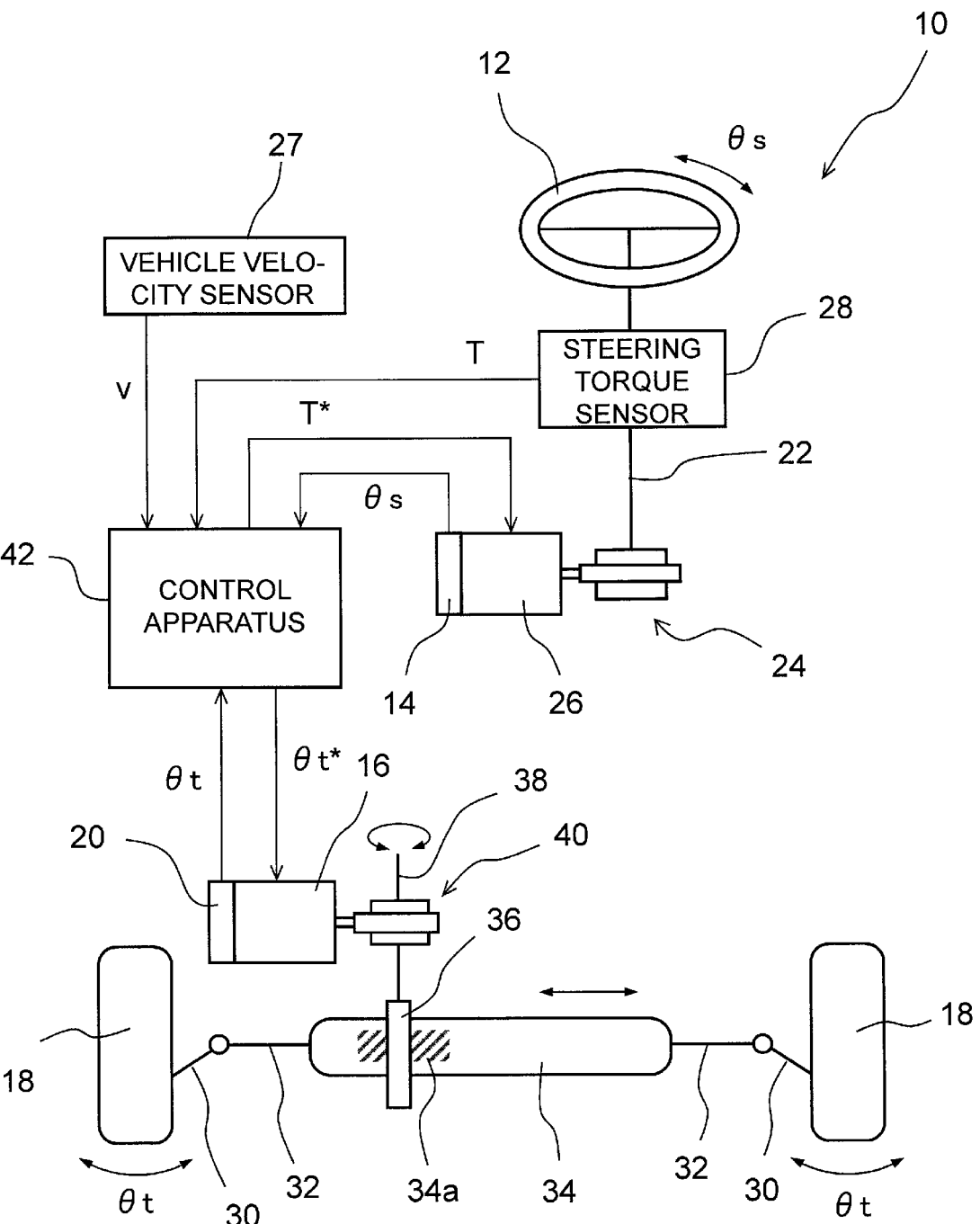
FIG. 1 is a diagram schematically showing a structure of a steering apparatus 10.

An embodiment of the present disclosure will now be described with reference to the drawings. FIG. 1 is a diagram schematically showing a structure of a steering apparatus 10. The steering apparatus 10 is a steer-by-wire steering apparatus. In the steer-by-wire steering apparatus, a steering wheel manipulated by a driver and a turning vehicle wheel which turns according to a motion of the steering wheel do not have a mechanical link to each other. The steering apparatus 10 has a steering wheel 12 manipulated by the driver. An angle of rotation of the steering wheel 12 from a neutral position is a steering angle. The steering angle is detected by a steering angle sensor 14, and a turning actuator 16 turns a turning wheel 18 based on the detected steering angle. In a typical vehicle, the turning wheel 18 is a front wheel. An angle of turn of the turning wheel 18 from a neutral position is a turning angle. The turning angle is detected by a turning angle sensor 20. When the vehicle is traveling straight forward, the steering wheel 12 and the turning wheel 18 are at the neutral positions, and the steering angle and the turning angle are 0°. The steering wheel 12 and the turning wheel 18 are rotatable and turnable both clockwise and counterclockwise. The rotation of the steering wheel 12 and the turning of the turning wheel 18 are symmetric. Therefore, in the following, only the rotation and the turning in one direction will be described. Accordingly, in the following, a "large" steering angle and a "large" turning angle refers to the absolute values thereof.

The steering wheel 12 is coupled to a steering shaft 22. A reaction force actuator 26 is connected to the steering shaft 22 via a connection mechanism 24. The connection mechanism 24 connects the reaction actuator 26 and the steering shaft 22 in such a manner that a motion of the reaction force actuator 26 corresponds to a rotation of the steering shaft 22. The reaction force actuator 26 may be formed from an electric motor. In this case, a steering angle of the reaction force actuator (electric motor) and a rotational angle correspond to each other. The connection mechanism 24 may be a gear mechanism, and in particular may be a gear pair formed from a worm and a worm wheel. The reaction force actuator 26 applies to the steering wheel 12 a reaction force torque according to a vehicle velocity, the steering angle, a steering angle velocity, and the like. The vehicle velocity is detected by a vehicle velocity sensor 27. A steering torque sensor 28 which detects a torque applied to the steering shaft 22 due to the steering by the driver is provided on the steering shaft 22. A steering torque T detected by the steering torque sensor 28 is used for feedback control of the reaction force actuator 26. Through the application of the reaction force torque, the driver can feel the reaction of the steering manipulation. In addition, the steering angle sensor 14 described above may be a sensor that detects a rotational angle of a rotor of the electric motor employed as the reaction force actuator 26.

The turning wheel 18 is rotatably supported on a steering knuckle (not shown). A knuckle arm 30 of the steering knuckle is linked to a tie-rod 32 in such a manner as to be bendable at a linkage point. The tie-rod 32 is linked to a steering rack 34 in such a manner as to be bendable at a linkage point. The steering rack 34 has a rack tooth 34*a*, which engages a pinion 36. The pinion 36 is fixed coaxially on a pinion shaft 38. The pinion shaft 38 is connected to the turning actuator 16 via a connection mechanism 40. The connection mechanism may be a gear mechanism, and in particular, a gear pair formed from a worm and a worm wheel. The connection mechanism 40 connects the turning actuator 16 and the pinion shaft 38 in such a manner that a rotation of the pinion shaft 38 corresponds to a motion of the turning actuator 16. When the turning actuator 16 operates, the pinion 36 rotates, and the steering rack 34 moves along a longitudinal direction thereof. The movement of the steering rack 34 is transferred to the turning wheel 18 via the tie-rod 32 and the knuckle arm 30, effecting turning of the turning wheel 18. The turning actuator 16 may be formed from an electric motor. In this case, a rotational angle of a rotor of the electric motor and the turning angle correspond to each other. In addition, the turning angle sensor 20 described above may be a sensor that detects a rotational angle of the rotor of the electric motor employed as the turning actuator 16. The turning actuator 16 is feedback-controlled based on the turning angle detected by the turning angle sensor 20.

The reaction force actuator 26 and the turning actuator 16 are controlled by a control apparatus 42. The control apparatus 42 calculates a target reaction force T* serving as a control target, based on a vehicle velocity v from the vehicle velocity sensor 27, a steering torque T from the steering torque sensor 28, and a steering angle $\theta_s$ from the steering angle sensor 14. The control apparatus 42 controls the reaction force actuator 26 so that the steering torque T becomes the target reaction force T*. In addition, the control apparatus 42 calculates a target turning angle $\theta_t$* serving as a control target based on the steering angle $\theta_s$. The control apparatus 42 control the turning actuator 16 so that the turning angle $\theta_t$ becomes the target turning angle $\theta_t$*. The control apparatus 42 may be formed from one processing unit. Alternatively, the control apparatus 42 may be formed from a plurality of processing units which apply processes with functions of the control apparatus 42 distributed.

Because in the steer-by-wire steering apparatus the steering wheel and the turning wheel do not have a mechanical link, it can be difficult for the driver to understand that the turning angle has reached an end of a turning range. In the steering apparatus 10, a steering range of the steering wheel 12 is virtually defined in correspondence to the turning range. This steering range will be hereinafter referred to as a virtual steering range. The control apparatus 42 controls the reaction force actuator 26 so that the reaction force applied by the reaction force actuator 26 rapidly increases when the steering angle $\theta_s$ becomes close to an end of the virtual steering range. The reaction force actuator 26 applies a large reaction force to the steering shaft 22 at the end of the virtual steering range. The driver can understand that the turning angle has reached the end of the turning range because the reaction force to the steering manipulation of the steering wheel 12 became large. This reaction force which increases at the end of the virtual steering range will be hereinafter referred to as an end steering reaction force. The end steering reaction force simulates the feeling of manipulation in the conventional steering apparatus.

In the steer-by-wire steering apparatus, a ratio of the turning angle $\theta_t$ to the steering angle $\theta_s$ is set according to the vehicle velocity, and, in particular, is set to a large ratio in comparison to the conventional steering apparatus in a vehicle velocity range with a low vehicle velocity. When the steering angle $\theta_s$ of the steering wheel 12 is the same, the turning wheel 18 is turned larger in the steer-by-wire steering apparatus than in the conventional steering apparatus. In the case of rapid steering performed suddenly by the driver such as the time of emergency avoidance, the steering angle $\theta_s$ to be steered by the driver does not significantly differ between the steer-by-wire steering apparatus and the conventional steering apparatus. Therefore, in the case of rapid steering, with the steer-by-wire steering apparatus there may be instances in which the steering angle $\theta_t$ becomes excessive.

Control during the rapid steering in the steering apparatus 10 will now be described.

Figure 2:
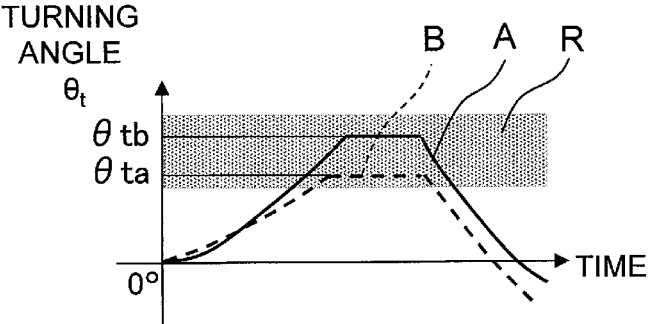
FIG. 2 is a diagram comparing a turning angle during rapid steering between a steer-by-wire steering apparatus and a conventional steering apparatus.

FIG. 2 is a diagram showing a response of the turning angle $\theta_t$ with respect to the steering manipulation during rapid steering. In FIG. 2, a solid line A shows a response in the steer-by-wire steering apparatus, and a broken line B shows a response in the conventional steering apparatus (non-steer-by-wire steering apparatus). In FIG. 2, a region R with hatching is a region in which a lateral force (cornering force) generated in the turning wheel 18 is saturated or reduced during the rapid steering. This region will be hereinafter referred to as a lateral force reduction region R.

It is known that, during emergency avoidance, the driver will commonly suddenly rotate the steering wheel 12 by a certain angle, regardless of whether or not the steering apparatus is the steer-by-wire steering apparatus. The turning angle $\theta_t$ in this case is $\theta_{ta}$ in the conventional steering apparatus. However, in the steer-by-wire steering apparatus, the steering angle $\theta_s$ reaches a limit $\theta_{sn}$ of the manipulation range (refer to FIG. 4) before the driver rotates the steering wheel 12 by the certain angle described above. The turning angle $\theta_t$ in this case is $\theta_{tb}$. The turning angle $\theta_{tb}$ is larger than the turning angle $\theta_{ta}$ during the rapid steering in the conventional steering apparatus. As shown in FIG. 2, in the case of the steer-by-wire steering apparatus, the turning angle $\theta_t$ is largely situated in the lateral force reduction region R. This shows that an increase of the lateral force corresponding to the increase in the turning angle $\theta_t$ is not obtained. Therefore, much of the steering operation at this point is meaningless. In addition, because the steering angle $\theta_s$ is also enlarged, when the driver returns the steering wheel 12 afterwards, the return of the turning wheel 18 tends to be delayed. In consideration of this situation, it is desirable that the turning angle $\theta_t$ does not enter the lateral force reduction region R.

The steering apparatus 10 according to the present embodiment narrows the virtual steering range during the rapid steering by generating the end steering reaction force at a smaller steering angle $\theta_s$. With this configuration, excessive turning of the turning wheel 18 is suppressed. The virtual steering range may be narrowed during the rapid steering so as to realize a turning angle similar to that in the conventional steering apparatus.

Figure 3:
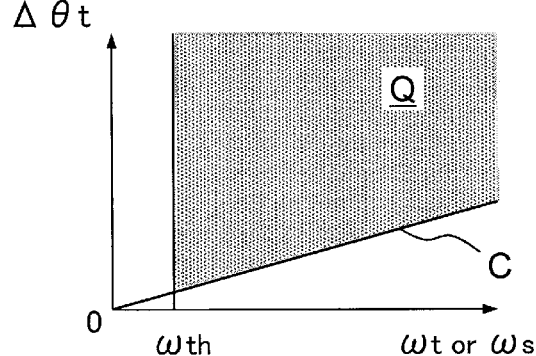
FIG. 3 is an explanatory diagram of judgment of a rapid steering manipulation.

FIG. 3 is an explanatory diagram of judgment of rapid steering such as the time of emergency avoidance. The horizontal axis of a graph shown in FIG. 3 represents a turning angle velocity $\omega_t$, and the vertical axis represents a turning follow delay $\Delta\theta_t$ ($=\theta_t*-\theta_t$) which is the delay of the actual turning angle $\theta_t$ with respect to the target turning angle $\theta_t*$. Alternatively, the horizontal axis may represent a steering angle velocity $\omega_s$. The turning angle velocity $\omega_t$ may be calculated from the turning angle $\theta_t$ by the control apparatus 42. Further, the steering angle velocity $\omega_s$ may be calculated from the steering angle $\theta_s$ by the control apparatus 42.

When the turning angle velocity $\omega_t$ is close to 0, the steering is not rapid steering. Therefore, when the turning angle velocity $\omega_t$ is smaller than or equal to a threshold $\omega_{th}$, the control apparatus 42 judges that the steering state is not the rapid steering state. Further, in the steering apparatus 10, the turning follow delay $\Delta\theta_t$ is also considered as a parameter for judging the rapid steering. When the driver is performing the counter-steer manipulation, a frictional force between the turning wheel 18 and the road surface is reduced, and thus, the turning follow delay $\Delta\theta_t$ is small. In addition, during the counter-steer manipulation, the steering angle $\theta_s$ is large, and it is not desirable to narrow the virtual steering range. Therefore, when the turning follow delay $\Delta\theta_t$ is small, the control apparatus 42 judges that the steering state is not the rapid steering state. There is a positive correlation between the turning angle velocity $\omega_t$ and the turning follow delay $\Delta\theta_t$. As such, a boundary of the rapid steering judgement based on the turning follow delay $\Delta\theta_t$ is a continuously-increasing straight line passing through the origin, as shown by a straight line C in FIG. 3.

When the turning wheel 18 contacts a curb, while the turning follow delay $\Delta\theta_t$ is large, the turning angle velocity $\omega_t$ is small. In this case, a different control from that during the rapid steering is applied in order to apply a reaction force simulating the contact with the curb. Therefore, the threshold $\omega_{th}$ of the turning angle velocity $\omega_t$ may be set so as to not interfere with the reaction force control during the contact with the curb.

Based on the above, the control apparatus 42 judges that the steering state is the rapid steering state when the turning angle velocity $\omega_t$ is greater than or equal to the threshold $\omega_{th}$, and the turning follow delay $\Delta\theta_t$ is greater than or equal to the boundary C which increases with the increase of the turning angle velocity $\omega_t$. Hatched region Q in FIG. 3 is the rapid steering region during the rapid steering state.

Figure 4:
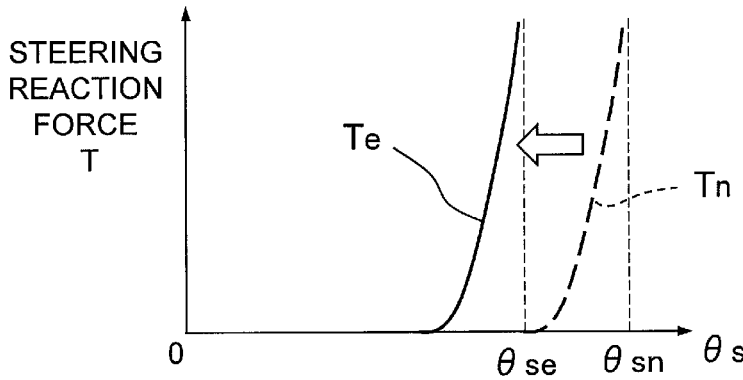
FIG. 4 is a diagram showing an end steering reaction force.

When the control apparatus 42 judges that the steering state is the rapid steering state, the control apparatus 42 sets the virtual steering range narrower in comparison to that at a normal time. FIG. 4 shows an example of control of the end steering reaction force. The horizontal axis of a graph shown in FIG. 4 represents the steering angle $\theta_s$. The vertical axis represents the steering reaction force, that is, the steering torque T applied to the steering shaft 22. In FIG. 4, an upper limit value of the virtual steering range during the normal time is shown by a normal-time upper limit steering angle $\theta_{sn}$. During the normal time, when the steering angle $\theta_s$ becomes close to the normal-time upper limit steering angle $\theta_{sn}$, the reaction force actuator 26 applies an end steering reaction force $T_n$, which rapidly increases, to the steering shaft 22, as shown by a broken line in FIG. 4. On the other hand, during the rapid steering, the control apparatus 42 sets a rapid-steering upper limit steering angle $\theta_{se}$ which is smaller than the normal-time upper limit steering angle $\theta_{sn}$. The reaction force actuator 26 applies an end steering reaction force $T_e$ during the rapid steering to the steering shaft 22 based on the rapid-steering upper limit steering angle $\theta_{se}$. The end steering reaction force $T_e$ during the rapid steering is a reaction force obtained by shifting the end steering reaction force $T_n$ during the normal time to the left in FIG. 4, and the shapes of the end steering reaction forces $T_e$ and $T_n$ are identical to each other.

Figure 5:
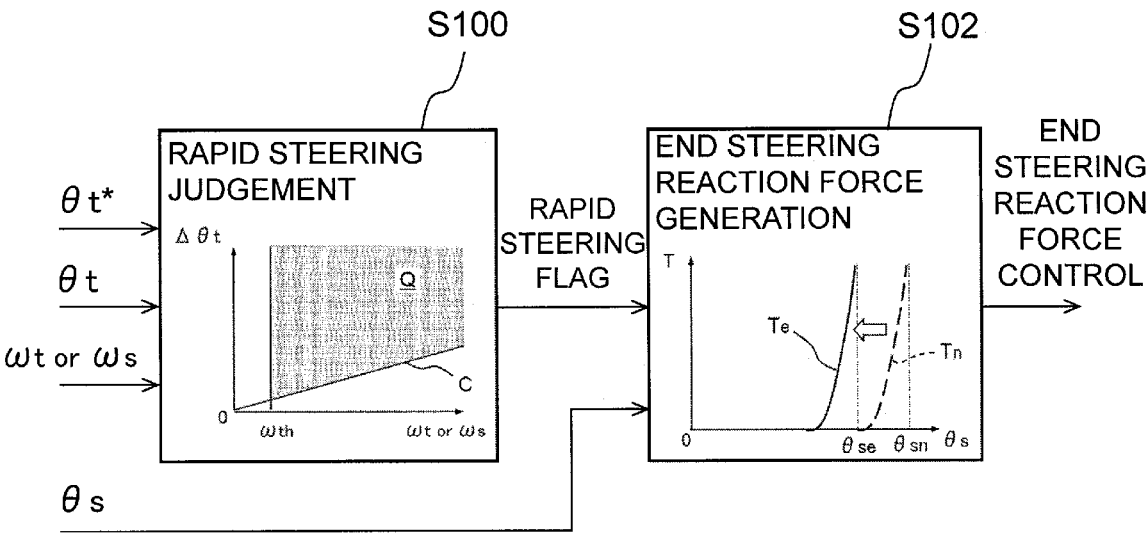
FIG. 5 is a block diagram showing control during rapid steering.

FIG. 5 is a block diagram showing generation of the end steering reaction force during the rapid steering. The control apparatus 42 judges the rapid steering based on whether or not the relationship among the target turning angle $\theta_t{}^*$, the actual turning angle $\theta_t$, and the turning angle velocity $\omega_t$ or the steering angle velocity $\omega_s$ is within the rapid steering region Q of FIG. 3 (S100). When the control apparatus 42 judges the rapid steering, the control apparatus 42 sets up a rapid steering flag. Further, when the rapid steering flag is set, the control apparatus 42 sets a narrower virtual steering range than the normal time, and generates the end steering reaction force when the steering angle $\theta_s$ is smaller than the normal time (S102). The control apparatus 42 controls the reaction force actuator 26, and the reaction force actuator 26 applies the end steering reaction force corresponding to the narrower virtual steering range to the steering shaft 22.

As the turning angle velocity $\omega_t$ or the steering angle velocity $\omega_s$ becomes larger, and/or as the turning follow delay $\Delta\theta_t$ becomes larger, the virtual steering range may be set to be narrowed stepwise or continuously.

Alternatively, the judgment of the rapid steering may be performed regardless of the turning follow delay $\Delta\theta_t$, and based only on the turning angle velocity $\omega_t$ or the steering angle velocity $\omega_s$.

The invention claimed is:

1. A steer-by-wire steering apparatus comprising:
a steering angle sensor that detects a steering angle of a steering wheel;
a turning actuator that turns a turning wheel according to a target turning angle which is a control target value of a turning angle of the turning wheel, calculated based on the steering angle;
a turning angle sensor that detects an actual turning angle which is an actual turning angle of the turning wheel turned by the turning actuator; and
a reaction force actuator that applies a steering reaction force, opposing a steering manipulation of a driver, to the steering wheel, wherein
the reaction force actuator applies, when the steering angle approaches a maximum value of a virtual steering range of the steering wheel, an end steering reaction force to the steering wheel, the end steering reaction force increasing as the steering angle approaches the maximum value of the virtual steering range, and
the virtual steering range is narrower than a steering range during a normal time, the virtual steering range being applied during controlled steering in which a turning angle velocity calculated based on the actual turning angle is greater than or equal to a predetermined value.

2. The steer-by-wire steering apparatus according to claim 1, wherein
the reaction force actuator applies the end steering reaction force to the steering wheel based on the steering range of the normal time in place of the narrower virtual steering range, when a turning follow delay which is a difference between the target turning angle and the actual turning angle is greater than or equal to a predetermined value during the controlled steering.

3. The steer-by-wire steering apparatus according to claim 2, wherein
the reaction force actuator applies the end steering reaction force to the steering wheel based on the virtual steering range which becomes narrower as the turning angle velocity becomes larger and/or as the turning follow delay becomes larger.

4. A steer-by-wire steering apparatus comprising:
a steering angle sensor that detects a steering angle of a steering wheel;
a turning actuator that turns a turning wheel according to a target turning angle which is a control target value of a turning angle of the turning wheel, calculated based on the steering angle; and
a reaction force actuator that applies a steering reaction force, opposing a steering manipulation of a driver, to the steering wheel, wherein
the reaction force actuator applies, when the steering angle approaches a maximum value of a virtual steering range of the steering wheel, an end steering reaction force to the steering wheel, the end steering reaction force increasing as the steering angle approaches the maximum value of the virtual steering range, and
the virtual steering range is narrower than a steering range during a normal time, the virtual steering range being applied during controlled steering in which a turning angle velocity calculated based on the actual turning angle is greater than or equal to a predetermined value.

* * * * *